United States Patent [19]
Sato

[11] Patent Number: 5,459,455
[45] Date of Patent: Oct. 17, 1995

[54] METHOD AND APPARATUS FOR DATA COMMUNICATION BETWEEN TRANSMISSION TERMINAL AND RECEPTION TERMINAL OF A NETWORK SYSTEM

[75] Inventor: Katsunori Sato, Tochigi, Japan

[73] Assignee: Kabushiki Kaisha Toshiba, Kawasaki, Japan

[21] Appl. No.: 271,588

[22] Filed: Jul. 7, 1994

Related U.S. Application Data

[63] Continuation of Ser. No. 917,972, Jul. 24, 1992, abandoned.

[30] Foreign Application Priority Data

Jul. 29, 1991 [JP] Japan ................................ 3-188867
Mar. 4, 1992 [JP] Japan ................................ 4-047022

[51] Int. Cl.⁶ .............................. G05B 23/02; H04Q 3/24
[52] U.S. Cl. ................... 340/825.07; 340/825.2; 370/85.2; 370/94.1
[58] Field of Search ................... 340/825.07, 825.08, 340/825.2, 825.06; 371/31–32; 370/30–33, 84, 85.2, 94.1; 395/200, 250

[56] References Cited

U.S. PATENT DOCUMENTS

| | | | |
|---|---|---|---|
| 4,162,483 | 7/1979 | Entenman | 340/825.08 |
| 4,692,894 | 9/1987 | Bemis | 364/900 |
| 4,695,839 | 9/1987 | Barbu et al. | 340/825.06 |
| 5,274,642 | 12/1993 | Widjaja et al. | 370/94.1 |
| 5,276,681 | 1/1994 | Tobagi et al. | 370/94.1 |
| 5,289,470 | 2/1994 | Chang et al. | 370/94.1 |
| 5,301,192 | 4/1994 | Henrion | 370/94.1 |
| 5,315,586 | 5/1994 | Charvillat | 370/84 |

OTHER PUBLICATIONS

James Martin, "Data Communication Technology" 1988, pp. 313–317, 321–325, 463 (Prentice–Hall, N.J.), TK5105.

*Primary Examiner*—Thomas G. Black
*Assistant Examiner*—David Yiuk Jung
*Attorney, Agent, or Firm*—Oblon, Spivak, McClelland, Maier & Neustadt

[57] ABSTRACT

In an apparatus for data communication between transmission terminal and reception terminal of a network system, a transmission side recognizes whether the transmitted data can receive or not, and the transmission side recognizes permissible capacity of reception about a reception side before the transmission side acquires the network circuit. If the data transmission becomes possible, then the transmission side acquires the circuit, transmits the data, and releases the circuit when the transmitting the data is finished.

8 Claims, 9 Drawing Sheets

| TERMINAL OF OTHER PARTY | 24b | 24c | ------ | 24f | 24g |
|---|---|---|---|---|---|
| OVERHEAD ACTUAL VALUE | | | | | |
| | | | | | |
| | | | | | |
| | | | | | |
| | | | | | |
| | | | | | |
| | | | | | |
| MEAN VALUE | | | | | |

METHOD AND APPARATUS FOR DATA COMMUNICATION BETWEEN TRANSMISSION TERMINAL AND RECEPTION TERMINAL OF A NETWORK SYSTEM

This application is a continuation of application Ser. No. 07/917,972, filed on Jul. 24, 1992, now abandoned.

BACKGROUND OF THE INVENTION

1. Field of the Invention

The present invention relates to a data communication system, more particularly, improvement of an efficiency of use of a network system.

2. Description of the Related Art

A conventional network system of the type of circuit switching, which is known by the telephone or facsimile etc., transmits data according to a way as shown in FIG. 1. First, transmission side calls to reception side, the transmission side acquires a communication line (we will call it to term 'circuit') when the circuit is not acquired by another pair of transmission/reception media. And the transmission side transmits the data to the reception side through the acquired circuit. If the transmission of the data is finished, then the acquired circuit is released. To take an instance as the telephone for understanding the above way, first, one person make a telephone call, if the other party is not situation of while the telephone call, the circuit is acquired by way of having the telephone call by the other party. And if the telephone call is finished, then the circuit is released by way of hanging up the receiver.

However, as shown in FIG. 1B, after the circuit is acquired by the above way, it may happen that the reception of the transmitted data cannot be continued before the data transmission is finished. For example, in the facsimile, if paper for printing runs out during the reception of the transmitted data, the reception of the transmitted data is stopped. And in a computer communication, if a capacity of a buffer memory becomes not enough during the reception of the transmitted data, transmitted data then cannot be received, and a transmission error is caused at the transmission side. In consequence, an effort of the transmission operator for the computer communication and the communication fee is wasted. Especially, when the quantity of data to be transmitted is large, then the waste is a heavy burden to the transmission operator.

And, the network system of the type of circuit switching, generally, has two-communication systems which are the system for transmitting data and the system for controlling the circuit acquisition etc. The communication system for control uses a relatively narrow frequency band, and the system has a lot of circuits, but the system for transmitting data a relatively wide frequency band, example 100 Mbps, and the system does not have many circuits. Hence, if are operator monopolizes the network circuit for transmitting the data after causing the transmission error, then the another operator loses a chance of using the network circuit, and as a result, the efficiency of use drops.

SUMMARY OF THE INVENTION

The present invention has been made in consideration of the above situation, the transmission side recognizes whether the transmitted data can be received or not, and the transmission side recognizes permissible capacity of reception about the reception side before the transmission side acquires the network circuit. Hence, the data communication system of the present invention can prevent the transmission error and the waste of the communication fee and the heavy load of the transmission operator also can be prevented. Moreover, the efficiency of use of the circuit is improved by way of avoiding useless monopolization of the circuit.

In order to achieve the above situation, an apparatus for data communication between transmission terminal and reception terminal of a network system of the present invention comprises:

data transmission means for transmitting a data;

data reception means for receiving the data transmitted from said data transmission means, the data reception means having reply means for transmitting a reply command to said data transmission means regarding propriety of data reception;

a communication line connecting said data transmission means to said data reception means for communicating the data between said data transmission means and said data reception means; and said data transmission means having
 a) reception requesting means for requesting a reception of the data to be transmitted for said data reception means,
 b) communication line acquiring means for acquiring said communication line base on reply regarding propriety of data reception.

DETAILED DESCRIPTION OF THE PREFERRED EMBODIMENT

An embodiment of a data communication system according to the present invention will now be described with reference to the accompanying drawings.

Figure 1A:
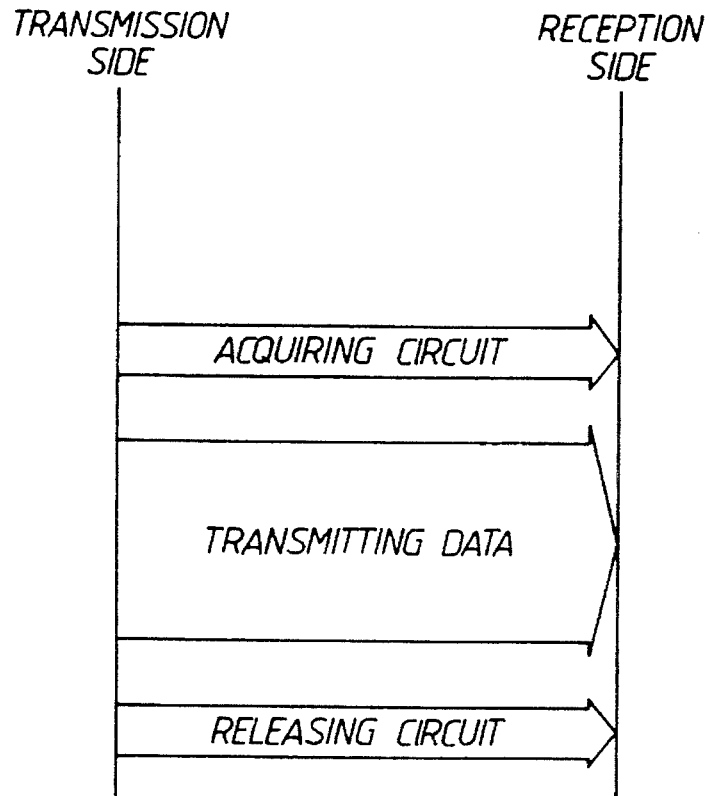
FIGS. 1A and 1B show a phase sequence diagram of a conventional data communication system.
Figure 1B:
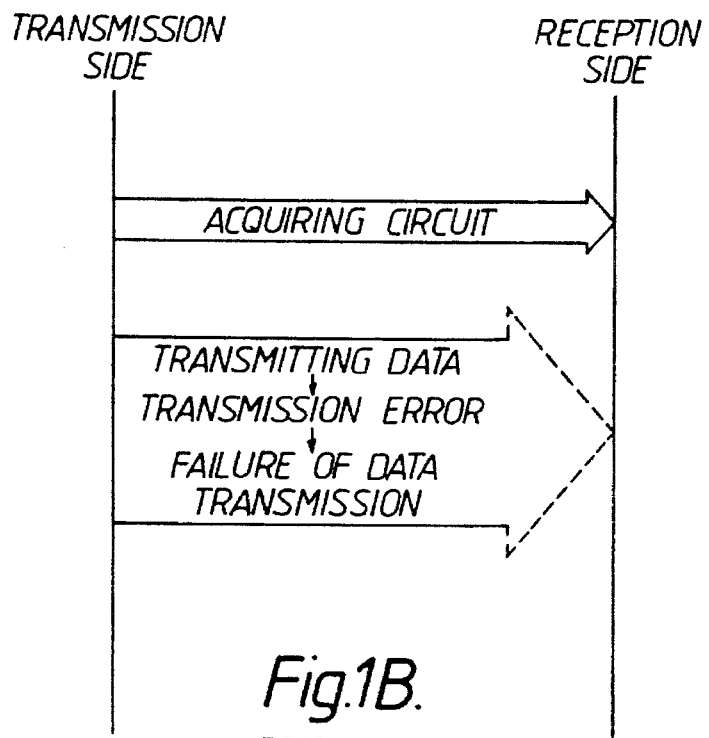
Figure 2:
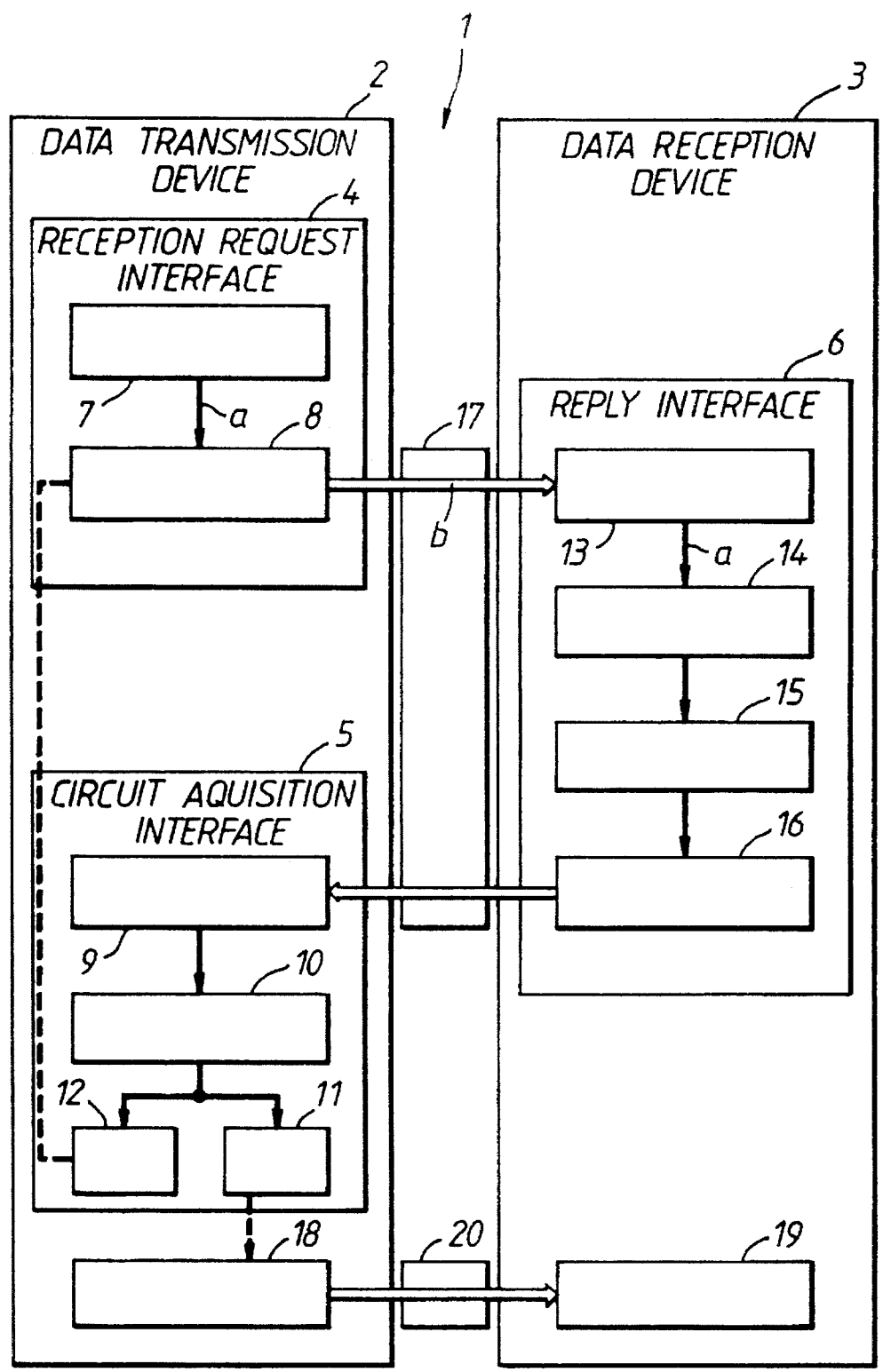
FIG. 2 is a block diagram of a data communication system of a present invention.

The data communication system 1 of a first embodiment is shown in FIG. 2. The data communication system 1 is constructed by data transmission device 2 and data reception device 3 which are able to communicate data through a communication system 17 for controlling data and the communication system 20 for transmitting data. Data transmission device 2 has a reception request interface 4 for requesting a reception of data to be transmitted to a reception side, a circuit acquisition interface 5 for acquiring the circuit based on a reply against a received reception request from the data reception device 3 or for setting up a time to issue a re-reception request, and a memory 18 for data transmitting. The data reception device 3 has a reply interface 6 for returning a reply concerning a received request from the reception request interface 4 to the data transmission device 2, and a memory 19 for data reception. Here, a narrow arrow a shown in FIG. 1 shows a flow of processing in the each interface 4, 5, and 6, and a thick arrow b shows a control data flow through the communication system 17 for controlling data, and a transmitted data flow through the communication system 20 for transmitting data. In the communication system 17 for controlling data and the communication system 20 for transmitting data it is desirable to use a same coaxial cable, but it is possible to use different coaxial cables.

The reception request interface 4 has a reception request command generator 7 for generating a reception request command which requests reception of the data to be transmitted from the data transmission device 2 to the data reception device 3, and reception request command transmitter 8 for transmitting the generated reception request command to the data reception device 3 through the communication system 17 for controlling data.

The circuit acquisition interface 5 has a reply command receptor 9 for receiving a reply from the data reception device 3 concerning the reception request command through the communication system 17 for controlling data, a reply command discriminator 10 for discriminating the reply command from the reply command receptor 9, a circuit acquisition circuit 11 for acquiring a circuit of the communication system 20 for transmitting data when the reply command is in a transmission permission command condition, and a timer 12 for setting up a time interval for re-generating the reception request command when the reply command is in transmission rejection command.

The reply interface 6 has a reception request command receptor 13 for receiving the reception request command from the reception request command transmitter 8 through the communication system 17 for controlling data, a reception propriety judgment circuit 14 for judging the propriety of receiving the data from the reception request command transmitter 8, a reply command generator 15 for generating two kind of reply commands, one of which is the transmission permission command generated when the reception propriety judgment circuit 14 judges that the data reception is possible, and other one of which is the transmission rejection command generated when the reception propriety judgment circuit 14 judges that the data reception is impossible, and a reply command return circuit 16 for returning the reply command to the data transmission device 2 through the communication system 17 for controlling data.

A process of data transmission using the data communication system 1 according to the present invention will be explained in reference to FIG. 3A and FIG. 3B.

Figure 3A:
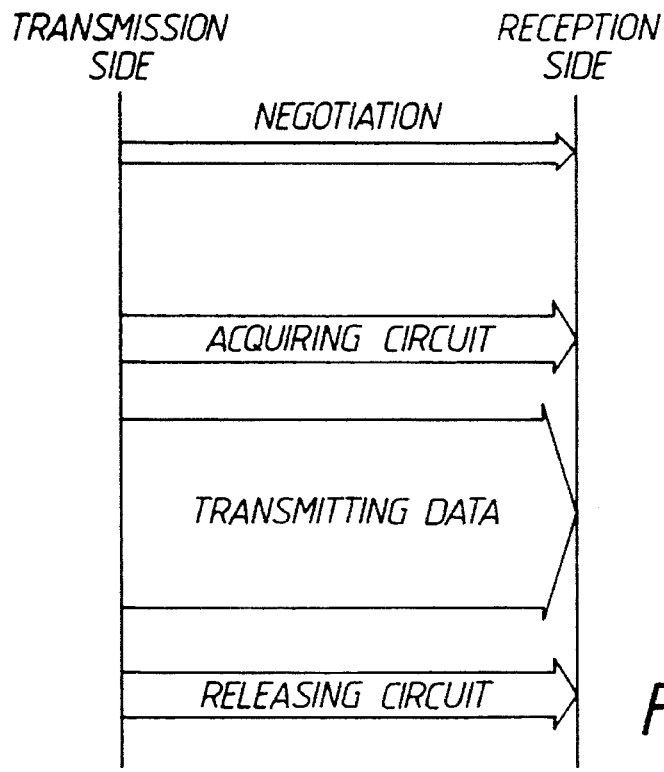
FIGS. 3A and 3B show a phase sequence diagram of the data communication system of FIG. 1.
Figure 3B:
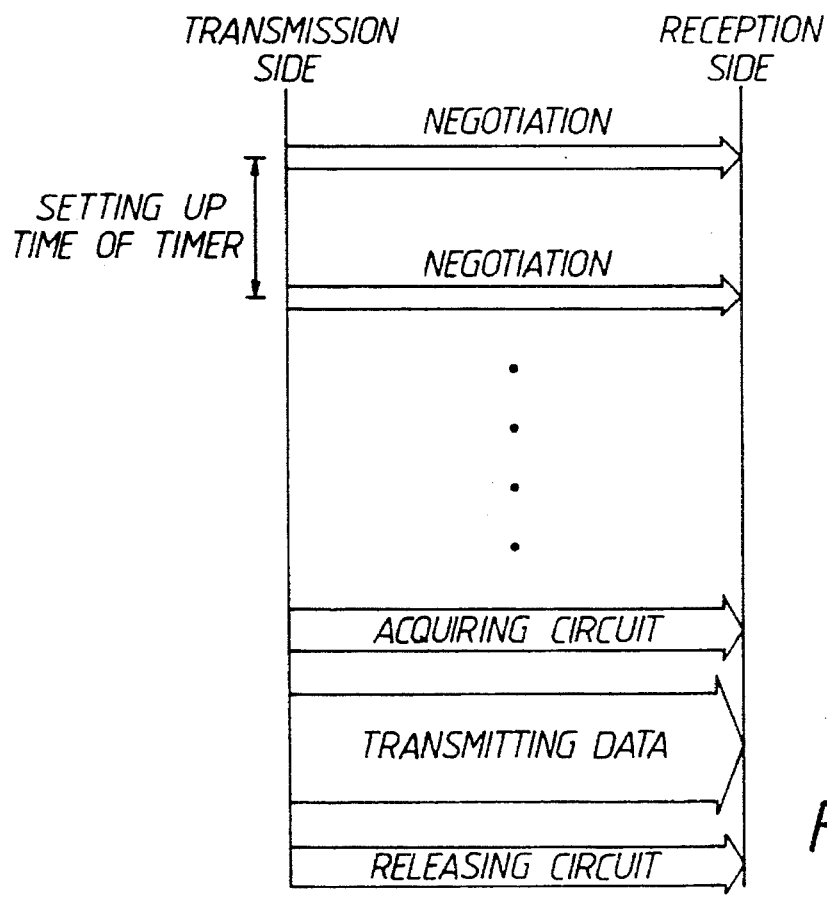

As shown in FIG. 3A, when the data transmits from the transmission side to reception side in the present invention, the transmission side transmits the reception request command to the reception side, and the transmission side confirms the reception propriety condition before the circuit is acquired by the transmission side. In other words, the transmission side executes negotiation with the reception side. By the negotiation, when the transmission side confirms that the reception side can receive the transmitted data, the transmission side acquires the circuit and transmits the data, if the data transmission is finished, the transmission side then releases the circuit.

When the transmission side confirms that the reception side can not receive the transmitted data, the transmission side does not transmit the data. And after a predetermined time lapse, the transmission side executes negotiation again with the reception side. This negotiation is repeated until the condition that the data transmission is possible is reached. If the data transmission becomes possible, then the transmission side acquires the circuit, transmits the data, and releases the circuit when the transmitting of the data is finished.

Figure 4:
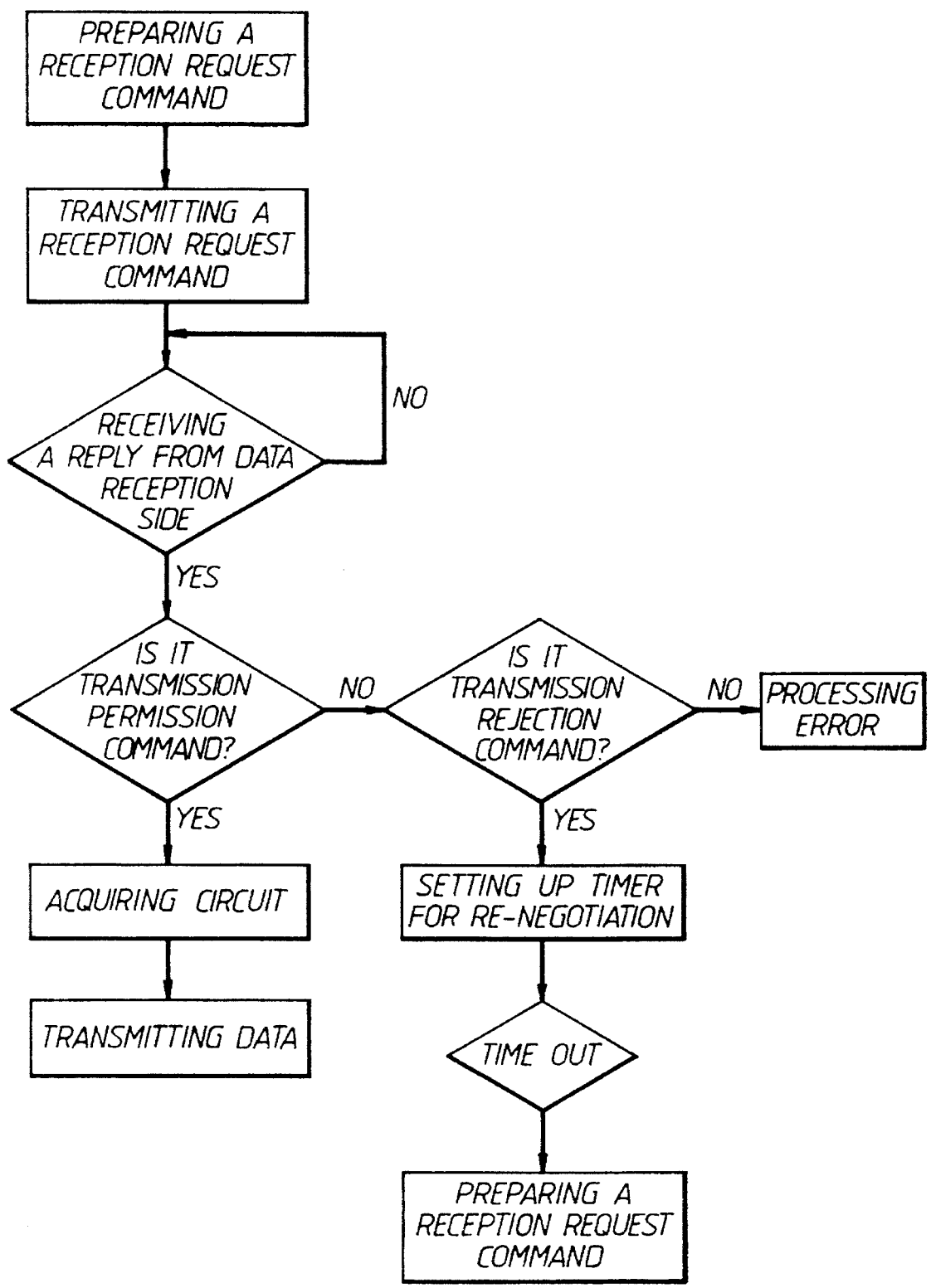
FIG. 4 is a flow chart illustrating an operation of a data transmission side.
Figure 5:
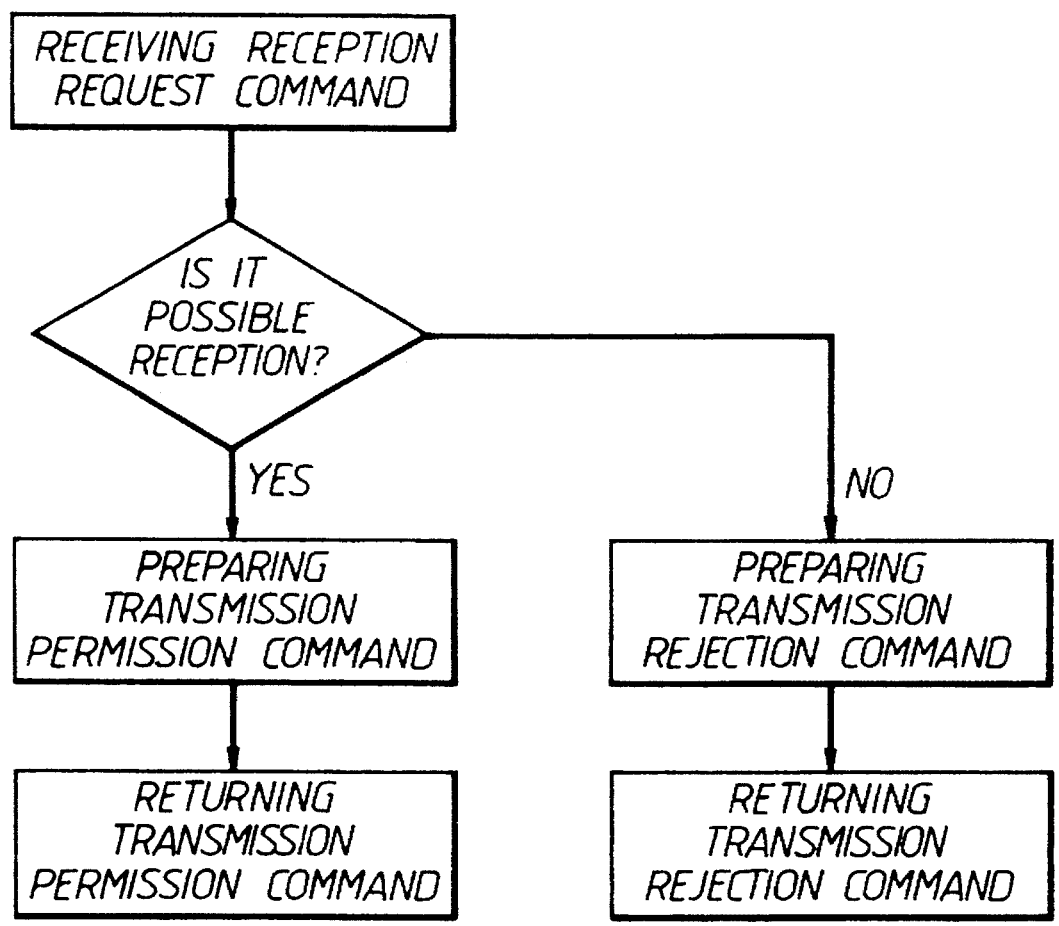
FIG. 5 is a flow chart illustrating an operation of a data reception side.

A detailed process of data transmission using the data communication system 1 will be explained in reference to FIG. 4 and FIG. 5. FIG. 4 and FIG. 5 are flow charts illustrating a operation of the data transmission device 2 and data reception device 3.

Figure 6A:
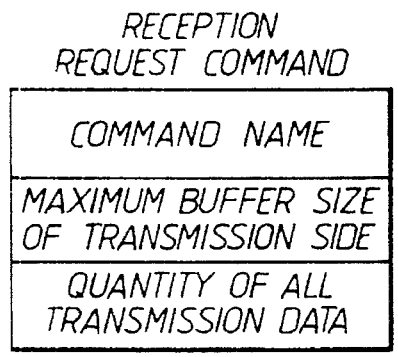
FIG. 6A shows a schematic format of a reception request command.

As shown in FIG. 4, first, the reception request command is generated by the reception request command generator 7 for requesting reception request to the reception side. The generated reception request command comprises two informations of the quantity of all of the transmission data to be transmitted by the transmission side, and a maximum buffer capacity of the memory 18 for data transmitting. The maximum buffer capacity indicates a maximum quantity of data which can be transmitted by the transmission side at one try, so we will call it transmission side buffer. The schematic data format of a reception request command is shown in FIG. 6A. The generated reception request command is transmitted to the reception request command receptor 13 of the reply interface 6 from the reception request command transmitter 8 of reception request interface 4 through the communication system 17 for controlling data.

Figure 6B:
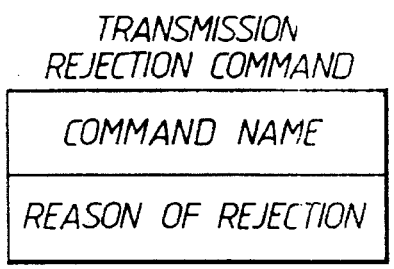
FIG. 6B shows a schematic format of a transmission rejection command.

Meanwhile, as shown in FIG. 5, the reception side receives the reception request command transmitted by the reception request command transmitter 8. The reception request command is received by the reception request command receptor 13 through the communication system 17 for controlling data. Next, the data of the reception request command is read out, and the propriety of the data reception by the reception propriety judgment circuit 14 is judged. Namely, when a buffer of the data reception memory 19 in the data reception device 3 is in use, the reception propriety judgment circuit 14 judges that the data reception is impossible, after that, the transmission rejection command is returned to the reply command receptor 9 of the circuit acquisition interface 5. This transmission rejection command comprises a rejection reason, for example, 'the buffer of the data reception memory is in use'. The schematic data format of the transmission rejection command is shown in FIG. 6B.

Figure 6C:
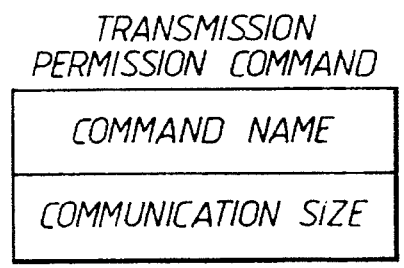
FIG. 6C shows a schematic format of a transmission permission command.

When the buffer of the data reception memory 19 is not in use, a communication capacity size is determined, and as written in a transmission permission command this communication capacity size information is returned to the reply command receptor 9 of the circuit acquisition interface 5. The communication capacity size indicates a quantity of data transmitted at one time of data transmission. This communication capacity size is determined by comparison of a maximum buffer capacity of the transmission side in the reception request command and a maximum buffer capacity of the data reception memory 19. The maximum buffer capacity indicates a maximum quantity of data which can be received by the reception side at one try, so we will call it reception side buffer capacity. A way of the comparison for determining the communication capacity size is as follows:

When the maximum buffer size of the transmission side is lager than maximum buffer size of the reception side, then the communication capacity size is that of the maximum buffer size of the reception side, and when the maximum buffer size of the transmission side is smaller than the maximum buffer size of the reception side, then the communication capacity size is that of the maximum buffer size of the transmission side. The schematic data format of the transmission permission command is shown in FIG. 6C.

Figure 7:
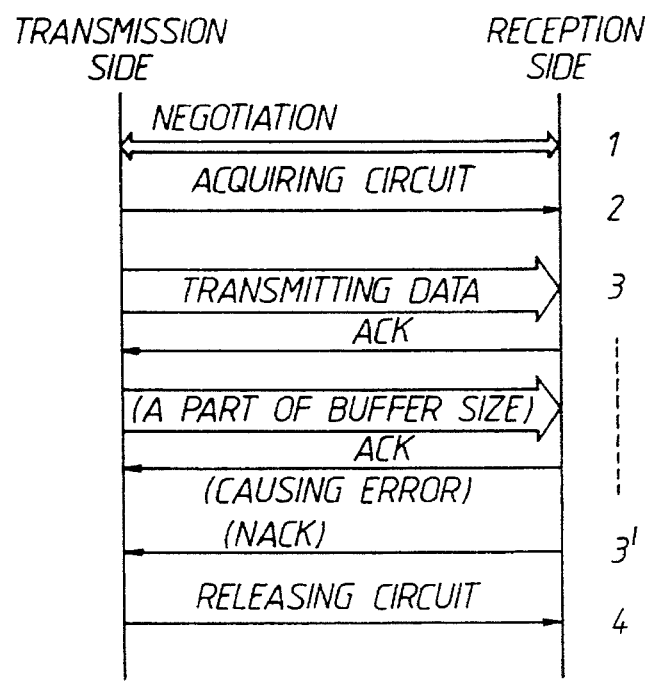
FIG. 7 shows a detailed phase sequence diagram of the FIG. 1A.

The reply command returned from the reply command return circuit 16 of the reply interface 6 to the reply command receptor 9 of the circuit acquisition interface 5 is read by the reply command circuit 10, and judged whether the reply command is the transmission permission command or the transmission rejection command is judged. If the reply command is the transmission permission command, then the circuit of the communication system 20 for transmitting data by the circuit acquisition circuit 11 of the circuit acquisition interface 5, and the data stored in the buffer of the data transmission memory 18 is transmitted to the buffer of the data reception memory 19 through the circuit acquired by the circuit acquisition circuit 11. This data are transmitted a required number of times. The required number of times is a value by which all of the transmitted data is divided by the communication size written in the transmission permission command. We will explain this transmission process in detail with reference to FIG. 7. This transmission process has follow steps:

(1) First, the data transmission device 2 and the data reception side 3 execute a negotiation each other.

(2) The buffer capacity size is determined to a small capacity side of the buffer memory, and the data transmission device 2 acquires the circuit.

(3) After the circuit is required, the data transmission device 2 transmits the data into divided a quantity of one message into the above buffer capacity size. And, the data reception device 3 executes the error check whenever the transmitted data is received. If the transmitted data is received to normality, then ACK (ACKnowledgement) is returned to the data transmission device 3. And if the transmitted data is not received, it is an error condition, then NACK (Negative ACKnowledgement) is returned to the data transmission device 3.

(4) When the data transmission is finished for one message, then the circuit is released.

When the reply command is the transmission rejection command, due to the timer 12 of the circuit acquisition interface 5, a time interval from a point of time of the receipt of the reply command until a point of time the generated reception request command again is set up.

When the reply of from the reception side is neither the transmission permission command nor transmission rejection command, then the transmission side executes a process of a transmission error.

In the above embodiment, the data communication is executed with the small side communication capacity of the buffer memory size of the data transmission device 2 or data reception device 3. However, the optimum communication capacity size for achieving a minimum communication size is determined by a message size and an overhead value which is the time it takes for acquiring the circuit or for returning the ACK or NACK, hence, data communication using the small buffer capacity side is not necessary for reducing the data communication time.

Consequently, we will explain about a data communication system which can determine the communication size that keeps to a minimum the data communication time of the one message.

Figure 9:
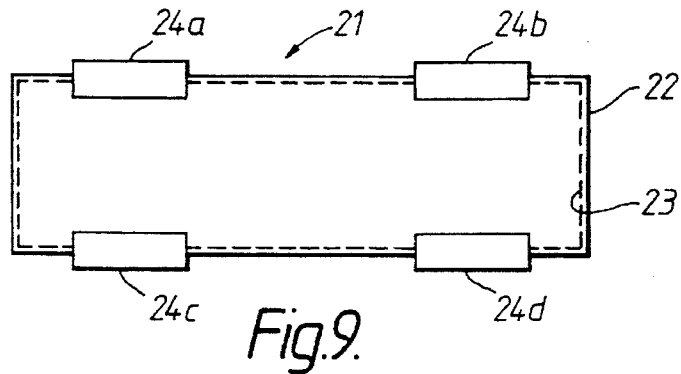
FIG. 9 shows a block diagram of a data communication system of a second embodiment of a present invention.

A second embodiment of the present invention is shown in FIG. 9.

In the FIG. 9, the network 21 features a communication system 22 for transmitting data (a circuit system), a communication system 23 for controlling data, for example the negotiation, acquiring the circuit, ACK, and NACK etc. (a packet system), and a plurality of terminal device 24a, 24b, 24c, and 24d which are connected to both the communication systems 23 and 24 for transmitting and receiving data of messages. Here, above communication systems 22 and 23 features one line 25 and the transmitting data and the controlling data are transmitted on the common line 25 as a practical matter, but there are both communication system 22 and 23 logically. Hence, we will use these communication system 22 and 23 independently for explaining the follow embodiment.

Figure 10:
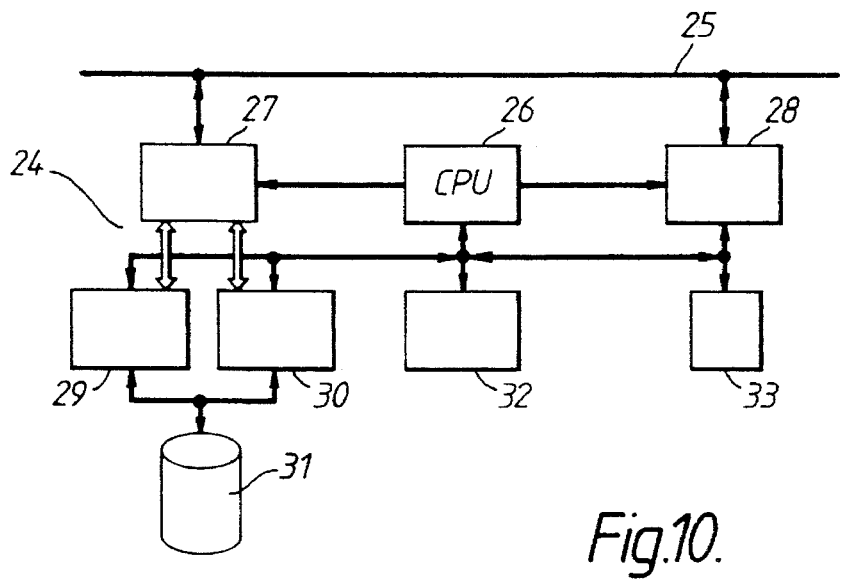
FIG. 10 shows a block diagram of a communication terminal device shown in FIG. 9.

A structure of the terminal device 24 is shown in FIG. 10. The terminal device 24 is comprised of a CPU 26 for controlling the terminal device 24, a data transmission and reception device 27 for transmitting and receiving the data between the terminal devices through the line 25, and a packet transmission and reception device 28. The packet transmission and reception device 28 executes negotiation for confirming whether a terminal of the other party is in a reception condition or not, determination of the buffer capacity size, acquisition of the circuit, the error check by the reception terminal (namely, if the transmitted data is received to normality, then ACK (ACKnowledgement) is returned to the data transmission device 24, and if the transmitted data is not received, it is an error condition, then NACK (Negative ACKnowledgement) is returned to the data transmission device 24), and generation of packet which comprise a control data (code) for releasing the circuit when the communication of one message is finished. And the packet transmission and reception device 28 further comprises buffer memories 29 and 30 for inputting and outputting the data transmitted and received through the data transmission and reception device 27, a magnetic disk device 31 (as an external memory device) for writing in or reading out through the buffer memories 29 and 30, a RAM 32 as an internal memory, and a ROM 33 for storing a process of how to determine a transmission buffer capacity size and communication control means 40 described later.

Figure 11:
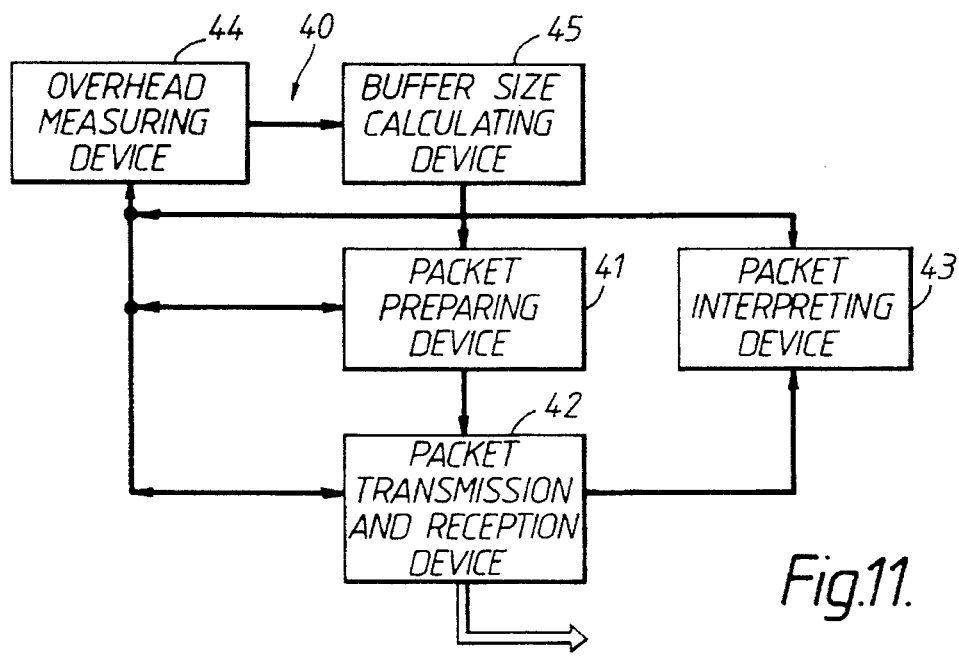
FIG. 11 shows a block diagram of a communication control means of a present invention.
Figures 12, 13:
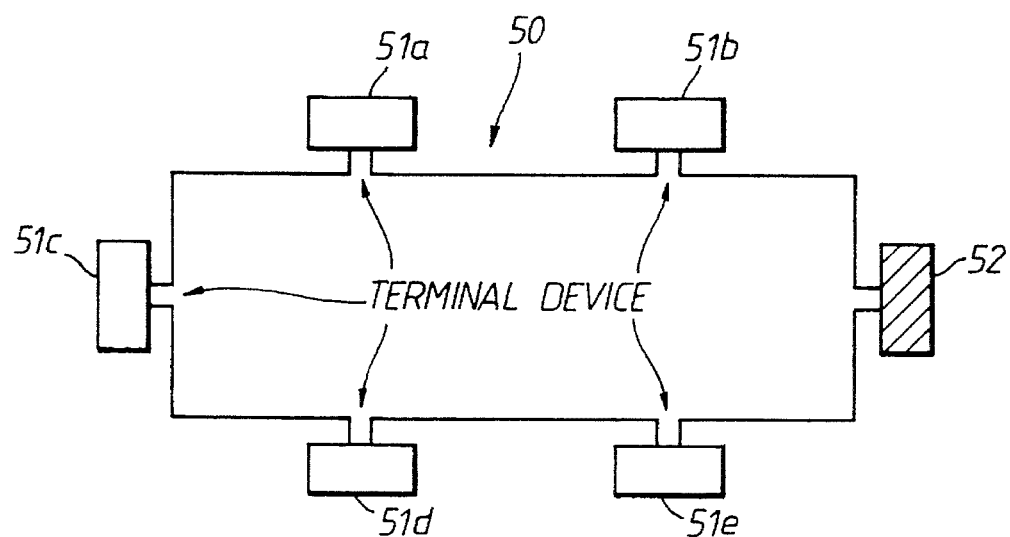
FIG. 12 shows a format of a measured overhead information table prepared by an overhead measure device.
FIG. 13 shows a block diagram of a data communication system of third embodiment of a present invention.

FIG. 11 shows a block diagram of the communication control means of the terminal device 24. In FIG. 11, a packet preparing device 41 prepares a packet for control information, such as the ACK or NACK, and transmits the prepared packet to the terminal devices 24b, 24c, and 24d of the other party by a packet transmission and reception device 42. At the other side, the packet received by the packet transmission and reception device 42 is interpreted by a packet interpreting device 43. An overhead measure device 44 calculates an overhead value based on a time required for preparing the packet prepared by the packet preparing device 41, a time required for transmitting and receiving the packet by the packet transmission and reception device 42, and a time required for interpreting the packet by a packet interpreting device 43. And the overhead measuring device 44 also prepares an overhead measuring information table of the terminal devices 24b, 24c, and 24d as shown in FIG. 12 by way of collecting each of the overhead value of the terminal devices 24b, 24c, and 24d, and calculates mean values at each terminal device based on the overhead measuring information table. Next, a buffer capacity size calculating device 45 calculates a transmission buffer capacity size of each terminal device based on the mean value or the message size of the terminal device of the other party, and the buffer size of the smaller of the buffer size of the transmission terminal device or buffer size of the reception terminal device. And the packet for control information which relates to the transmission buffer capacity size is prepared by the packet preparing device 41, and transmitted to the terminal devices 24b, 24c, and 24d by the packet transmission and reception device 42.

Consequently, the terminal device 24a communicates with a message divided by way of the above mentioned transmission step (3) after acquiring the circuit by way of the above mentioned transmission step (2).

The first embodiment regarding determination of the transmission buffer capacity size has the following steps:

(1) Terminal device 24a prepares the packet for communication control information, for example status, controlling code, or controlling data like the overhead value or the transmission buffer capacity size, and the prepared packet is transmitted to the terminal devices 24b, 24c, and 24d.

(2) The packet interpreting device 43 interprets a control information of the packet transmitted from the terminal devices 24b, 24c, and 24d, and prepares the overhead measuring information table, as the case may be generates a code for shifting to an other required process.

(3) The overhead measuring device 44 measures an overhead value (actual value) of each terminal device by way of counting the preparing and transmitting time of the packet, and reception time and interpretation time of the packet.

(4) The terminal device 24a transmits the overhead value to the terminal devices 24b, 24c, and 24d. Hence, for each terminal device 24 can be obtained the overhead value of each terminal device in the negotiation before acquiring the circuit. Consequently, the terminal 24a counts the overhead value of each terminal device 24b, 24c, and 24d at the transmission and reception timing, and prepares the overhead measuring information table as shown in FIG. 12. In this case, a number of the overhead actual values are set at six, and the overhead actual values are renewed by a push-down method in real time.

(5) The overhead measuring device 44 calculates the mean value of overhead of the each terminal device 24b, 24c, and 24d by using the overhead measuring information table. The overhead value as the mean value is matched to the actual situation since in the overhead measuring information table are registered the newest actual overhead values in real time.

Figure 8:
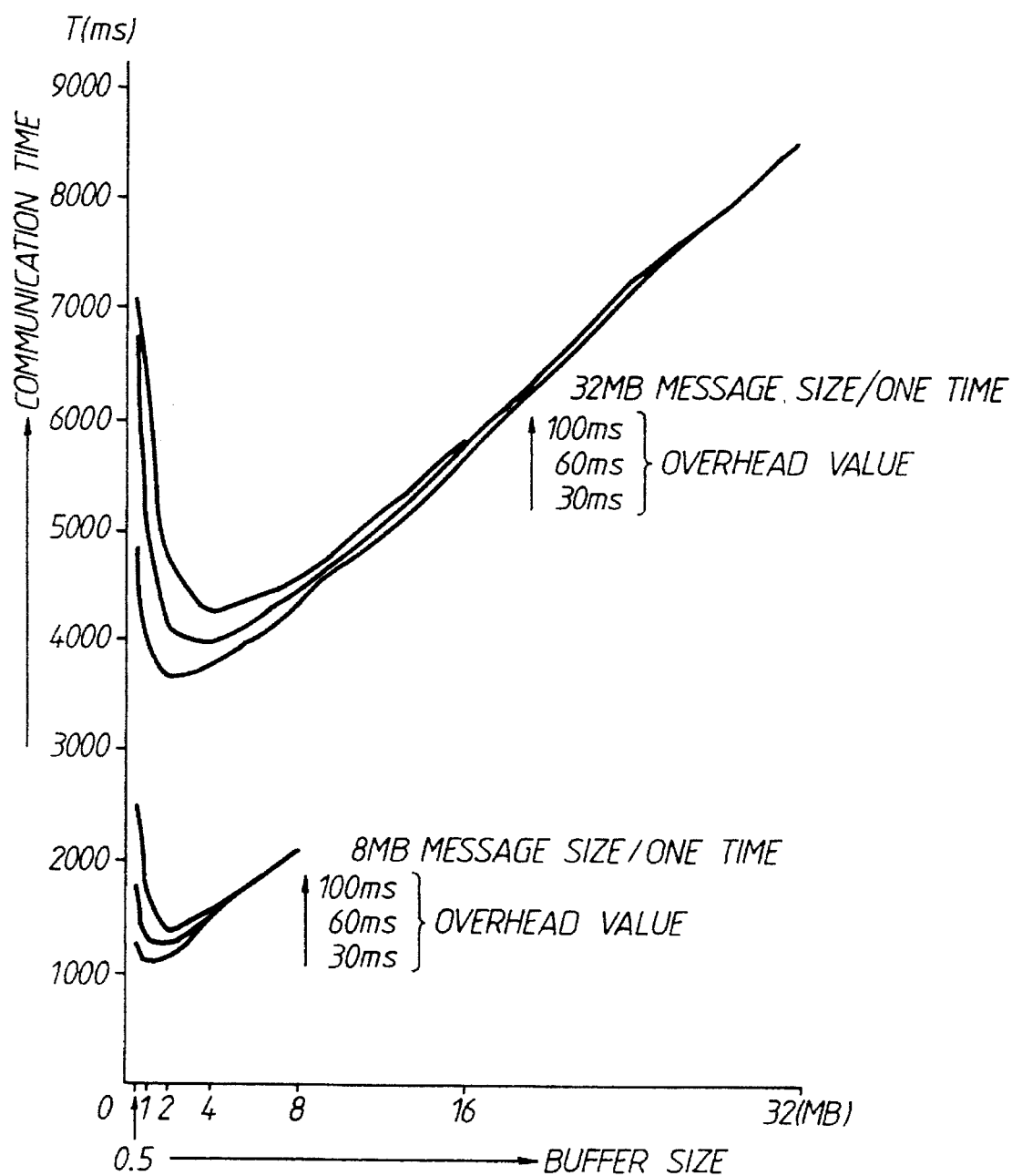
FIG. 8 is a graph showing the relation between a communication time and a buffer size.

(6) The buffer capacity size calculating device 45 determines a transmission buffer capacity size which is enough for the minimum communication time based on the overhead value of the transmission terminal device obtained by above step (4) or the mean value of the overhead value of reception terminal device obtained by above step (5), the message size to be transmitted, and a smaller buffer capacity size which the buffer of the reception terminal device or the buffer of the transmission terminal device. This way of selecting the smaller buffer capacity size between the transmission and reception terminal device is described as follows:

For example, the parameters will be defined as that the message size is SA, the transmission buffer size SB, all transmission time is TA, transmission time for quantity of one buffer is TB, and the overhead value of the transmission terminal device or the mean value of the overhead value of reception terminal device is TO. In this case, the follow equation results in the FIG. 8, here, the SB of which TA is satisfied in minimum can read in FIG. 8.

$$TA = MAX(TO, TB) + (TB + TO*(SA/SB)) + MAX(TO, TB-TO)$$

Here, if the overhead value transmitted from the terminal device 24a to the terminal device 24b is defined as Tab, then TO=Tab, and if the overhead value transmitted from the terminal device 24b to the terminal device 24a is defined as Tba, then TO=Tba. Namely, in FIG. 8, the X-axis shows the SB (transmission buffer size) and the Y-axis shows the TA (all transmission time). If the buffer size of which communication time is satisfied in minimum is a condition that the transmission message size is 8 MB and the overhead values are 30 ms, 50 ms, and 100 ms, then the minimum buffer capacity size is in a range between 0.5 MB and 2 MB. And, if the buffer size is in a condition that the transmission message size is 32 MB and the overhead values are 30 ms, 50 ms, and 100 ms, then the minimum buffer capacity size is in a range between 1.5 MB and 4 MB. The above things are obvious by FIG. 8. An accurate value of the transmission buffer size can be calculated based on the above equation. Consequently, the transmission buffer size of which communication time is satisfied in minimum can be determined.

The terminal device 24 transmits the data conformed to the calculated transmission buffer size to the terminal device of the other party by way of above step (1).

The third embodiment of the network system according to present invention is shown in FIG. 13. In FIG. 13, network 50 includes a plurality of terminal devices 51 connected to the communication system and transmits and receives the data, and an overhead value correcting terminal 52 for transmitting the mean value calculated based on a transmitted overhead value from each terminal to each terminal.

The terminal device 51 is similar to the terminal device 24 shown in FIG. 11 as the first embodiment, except for the function of the overhead measuring device 44 and the buffer size calculating device 45 in the communication controlling device 40. In this embodiment, the overhead measuring device 44 in the transmission terminal device 51 calculates the overhead value based on a packet preparing time by the packet preparing device 41, the transmission and reception time of the packet by the packet transmission and reception device 42, and the interpreting time of the packet by the packet interpreting device 43. And the packet preparing device 41 prepares the packet which is includes the calculated overhead value and transmits the packet to the overhead value correcting terminal 52 at each predetermined time interval by the packet transmission and reception device 41. The overhead value correcting terminal 52 transmits the packet which includes the mean value of collected overhead value transmitted from the each transmission terminal device 51 to each transmission terminal device 51. This transmission terminal device 51 obtains a mean value of the overhead value by means of analyzing the transmitted packet from the overhead value correcting terminal 52. And the buffer size calculating device 45 calculates, based on the overhead value of the transmission terminal device 51a, the mean value of the overhead value of the reception terminal device obtained by the overhead value correcting terminal 52, the message size to be transmitted, and a smaller buffer capacity size of the buffer of the reception terminal device or the buffer of the transmission terminal device.

According to above embodiment, the overhead value correcting terminal 52 collects the overhead value transmitted at each predetermined time interval from each terminal, and transmits the calculated mean value to each transmission terminal 51. Hence, in each terminal 51 can be obtained the transmission buffer size similar to the first embodiment.

And, the above mentioned second way of determination of the transmission buffer size comprises the follow processes:

(a) Transmission terminal device 51 prepares the packet for communication control information, for example status, controlling code, or controlling data like the overhead value or the transmission buffer capacity size, and the prepared packet is transmitted to the terminal devices 51b, 51c, 51d, and 51e.

(b) The packet interpreting device 43 interprets a control information of the packet transmitted from the terminal devices 51b, 51c, 51d, and 51e, and prepares the overhead measuring information table, and, as the case may be, generates a code for shifting to an other required process.

(c) The overhead measuring device 44 measures a overhead value (actual value) at each terminal device 51b, 51c, 51d, and 51e by way of counting the preparing and transmitting time of the packet, and reception time and interpretation time of the packet.

(d) The terminal device 51a transmits the overhead value to the overhead value correcting terminal 52 at the predetermined time interval.

(e) The overhead value correcting terminal 52 collects the overhead values transmitted from each terminal 52 at the predetermined time interval, and transmits the packet which is mean value calculated from the overhead values.

(f) The transmission terminal device 51a analyses the packet transmitted by way of above process (e), and obtains the mean value of the overhead value in the transmission terminal devices 51b, 51c, and 51d.

(g) The buffer capacity size calculating device 45 determines a transmission buffer capacity size which is for the minimum communication time based on the overhead value of the transmission terminal device 51a or the mean value of the overhead value of reception terminal device obtained by above process (f), the message size to be transmitted, and a smaller buffer capacity size of the buffer of the reception terminal device or the buffer of the transmission terminal device.

The transmission terminal device 51 transmits the data conformed to the calculated transmission buffer size to each reception terminal device by way of above process (a).

According to the above mentioned invention, the data communication system can prevent the transmission error and the waste of the communication fee and the heavy load of the transmission operator also can be prevented.

In the above embodiment, we explained the data communication case that the data is transmitted from a terminal having the data transmission device 2 to a terminal having the data reception device 3, however, the present invention is not limited thereto. For example, the present invention is also applicable to a case in which each terminal has both the data transmission device 2 and the data reception device 3. In this case, each terminal can mutual communicate data through both the communication system 17 for controlling data and the communication system 20 for transmitting data.

Numerous modifications and variations of the present invention are possible in light of the above teachings. It is therefore to be understood that, within the scope of the appended claims, the present invention can be practiced in a manner other the as specifically described herein.

What is claimed is:

1. An apparatus for data communication between a transmission terminal and a reception terminal of a network system, comprising:

a data transmission means for transmitting data and comprising a first buffer memory;

a data reception means for receiving the data transmitted from said data transmission means, the data reception means comprising a second buffer memory and a reply means for transmitting a reply command to said data transmission means, the reply command setting forth data of a propriety of data reception and a size of the second buffer memory;

a communication line connecting said data transmission means to said data reception means for communicating the data between said data transmission means and said data reception means; and said data transmission means further comprising:

a reception requesting means for transmitting a reception request command to the data reception means, the reception request command setting forth data of a size of the data to be transmitted and a size of the first buffer memory;

a communication line acquiring means for acquiring said communication line based on the reply command generated by the data reception means regarding propriety of data reception;

a transmitting means for transmitting the data to be transmitted in units of messages, a size of each message being a smaller of a size of the first buffer memory of the data transmission means or a size of the second buffer memory of the data reception means.

2. The apparatus according to claim 1, wherein the reply command further comprises either a transmission permission command or a transmission rejection command.

3. The apparatus according to claim 2, wherein the data is transmitted from the data transmission means to the data reception means before said communication line is acquired when the reply command is a transmission permission command, and the reception request command is transmitted again from the data transmission means to the data reception means after a predetermined period of time when the reply command is a transmission rejection command.

4. The apparatus according to claim 1, wherein the reply means further generates a signal indicating whether the data has been transmitted without any errors.

5. An apparatus for data communication between a transmission terminal and a reception terminal of a network system, comprising:

a data transmission means for transmitting data in units of packets and comprising a first buffer memory;

a data reception means for receiving the data transmitted from said data transmission means, the data reception means comprising a second buffer memory and a reply means for transmitting a reply command to said data transmission means, the reply command setting forth data of a propriety of data reception and a size of the second buffer memory;

a communication line connecting said data transmission means to said data reception means for communicating the data between said data transmission means and said data reception means;

overhead value measuring means for measuring an overhead value of a time required for preparing each packet, a time required for transmitting and receiving each packet and a time required for interpreting each packet;

buffer size calculating means for calculating a buffer size of the first buffer memory to minimize a transmission time based on the measured overhead value and a smaller of a size of the first buffer memory of the data transmission means or a size of the second buffer memory of the data reception means;

said data transmission means further comprising:

a reception requesting means for transmitting a reception request command to the data reception means, the reception request command setting forth data of a size of the data to be transmitted and a size of the first buffer memory;

a communication line acquiring means for acquiring said communication line based on the reply command generated by the data reception means regarding propriety of data reception.

6. The apparatus according to claim 5, wherein the reply command further comprises either a transmission permission command or a transmission rejection command.

7. The apparatus according to claim 6, wherein the data is transmitted from the data transmission means to the data reception means before said communication line is acquired when the reply command is a transmission permission command, and the reception request command is transmitted again from the data transmission means to the data reception means after a predetermined period of time when the reply command is a transmission rejection command.

8. The apparatus according to claim 5, wherein the reply means further generates a signal indicating whether the data has been transmitted without any errors.

* * * * *